United States Patent [19]
Pazik

[11] Patent Number: 5,197,308
[45] Date of Patent: Mar. 30, 1993

[54] STEERING WHEEL SECURITY DEVICE

[76] Inventor: John A. Pazik, Rte. 1, Box 152, Clearwater, Minn. 55320

[21] Appl. No.: 890,134

[22] Filed: May 29, 1992

[51] Int. Cl.$^5$ .............................................. B60R 25/02
[52] U.S. Cl. ........................................ 70/209; 70/226
[58] Field of Search ...................... 70/18, 19, 209, 211, 70/212, 225, 226, 227, 237, 238

[56] References Cited

U.S. PATENT DOCUMENTS

| | | | |
|---|---|---|---|
| D. 289,491 | 4/1987 | Johnson | D8/330 |
| 1,169,965 | 2/1916 | Kellogg | 70/212 |
| 1,221,882 | 4/1917 | McMahan et al. | 70/212 |
| 1,257,322 | 2/1918 | Cunningham | 70/227 |
| 1,377,157 | 5/1921 | Price | 70/212 |
| 1,421,401 | 7/1922 | Byers | 70/212 |
| 3,462,982 | 8/1969 | Moore . | |
| 3,690,131 | 9/1972 | Davis | 70/238 X |
| 3,742,743 | 7/1973 | Stoyanovitch | 70/225 X |
| 4,103,524 | 8/1978 | Mitchell et al. | 70/209 |
| 4,304,110 | 12/1981 | Fain | 70/209 |
| 4,699,238 | 10/1987 | Tamir | 70/238 X |
| 4,738,127 | 4/1988 | Johnson | 70/209 |
| 5,024,069 | 6/1991 | Hull, Jr. et al. | 70/238 X |
| 5,052,201 | 10/1991 | Liou | 70/226 X |
| 5,119,651 | 6/1992 | Yang | 70/209 X |

FOREIGN PATENT DOCUMENTS

| | | | |
|---|---|---|---|
| 2718291 | 10/1978 | Fed. Rep. of Germany | 70/226 |
| 1127524 | 9/1968 | United Kingdom | 70/226 |

*Primary Examiner*—Lloyd A. Gall
*Attorney, Agent, or Firm*—James W. Miller

[57] ABSTRACT

The present invention relates to an improved vehicle security device of the steering lock type for use on the steering wheel of a moveable vehicle, such as an automobile, truck, boat or the like. The steering lock device is of the type having two separable bar sections locked together to form an elongated locking bar that extends beyond the rim of the steering wheel to prevent the steering wheel from being significantly turned. The current invention comprises such a device with an improved attachment for preventing the device from being lifted off the steering wheel. In one embodiment, a double forked end is provided on each bar section formed by two downwardly extending forked tines that extend beneath an overlying section of the bar section. The double forks are located in a position to engage against the rim of the steering wheel with each fork being located on opposite sides of a reinforcing member that is part of the steering wheel. In another embodiment, radially inner forked sections are used on the radially inner ends of the bar sections to surround the central hub of the steering wheel beneath the reinforcing member.

6 Claims, 1 Drawing Sheet

STEERING WHEEL SECURITY DEVICE

TECHNICAL FIELD

The present invention relates to a security device for use with a vehicle, such as an automobile, truck or boat, which makes it more difficult to steal the vehicle. More particularly, the present invention relates to a "steering lock" security device which is attached to the vehicle's steering wheel to prevent the steering wheel from being turned, thereby discouraging theft by preventing the vehicle from being steered even if it can be started.

BACKGROUND OF THE INVENTION

Various types of vehicle security devices are known which can generally be referred to as "steering lock" devices. These devices comprise elongated bars made in two sections which can be connected and locked together using a key lock or some other appropriate locking apparatus. When the bar sections are so assembled, they form a security bar which extends across the diameter of the steering wheel. The user or owner of the vehicle can, of course, unlock and remove the bar sections from the steering wheel when operation of the vehicle is desired.

One or more of the bar sections in this type of security device extends outwardly past the rim of the steering wheel a sufficient distance so that the extended bar section would engage against the seat of the vehicle, or some other portion of the vehicle, if the steering wheel is being turned. This prevents the wheel from being turned far enough and thus prevents the vehicle from being driven. The theory behind such devices is that someone attempting to steal the vehicle must first remove the steering lock device to allow the steering wheel to be operated in order to drive the vehicle. Since the bar sections are made of hardened steel which are difficult to cut, the presence of such devices discourages a potential thief from stealing the vehicle.

The bar sections in these types of steering lock devices include forked sections which are inserted over the rim of the steering wheel to prevent the devices from being lifted off once they are installed and locked in place. These forked sections include a single fork tine which extends downwardly beneath the steering wheel rim to allow the rim to be received in the fork formed between the tine and the bar section. The forked sections point in a radially outwardly direction to allow the forked sections to be telescopically inserted on the rim of the steering wheel when the two bar sections of the security device are not connected to one another. Following such insertion, the two bar sections are interfit with one another and locked together to allow the security device to perform its intended function.

U.S. Pat. No. 4,738,127 to Johnson and U.S. Design Pat. No. 289,491 to Johnson both disclose steering locks of the general type described above. These locks are being sold in the marketplace by Winner International under the name Super Club. Both the manner of construction and the method of use of these devices are well known.

It is a common misperception that steering wheels are strong and/or are rigidly constructed. Actually, many steering wheels are constructed of an inner circular core made of a metallic material with a relatively thick covering around the core made of leather, plastic or the like. The covering is thick enough such that the steering wheel has a substantial appearance and feel to it. However, the metallic portion of the steering wheel, i.e., the inner metallic core, is typically not constructed of large gauge stock and is not specially hardened in any way. Accordingly, it is relatively easy to take a tool such as a bolt cutter and cut through the steering wheel by severing the steering wheel rim, i.e. by cutting downwardly through the rim through both the outer covering and the inner metallic core.

While the conventional prior art steering lock devices discussed above are made of thick hardened steel which is difficult to cut, the Applicant believes that these devices can be relatively easily defeated by cutting the steering wheel apart instead of trying to cut the security bar itself. For example, to remove a Super Club device from a steering wheel, all one would have to do would be to take the bolt cutter and cut the steering wheel on either side of one of the forked ends of the device. This requires only two cuts in the steering wheel rim, i.e. one cut on one side of the forked end and the other cut on the other side of the forked end. If this is done, the section of the steering wheel rim lying within the forked end will drop out or could be pushed out and the device then easily lifted off the steering wheel.

Accordingly, such devices would be relatively easy to defeat by a thief having knowledge of this procedure. The known prior art devices are simply not as secure as they appear.

SUMMARY OF THE INVENTION

One aspect of the present invention is to provide an improved vehicle security device of the steering lock type which is much more difficult to remove than the known prior art devices, thereby enhancing the effectiveness of such a device for the purpose for which it is intended, namely to discourage stealing of the vehicle.

Accordingly, one embodiment of the current invention comprises an improved vehicle security device suited to be attached to the steering wheel of a vehicle. The steering wheel has a peripheral rim and at least one reinforcing member which extends inwardly from the rim in a generally radial direction. The security device is of the type having two separable bar sections which may be connected and locked together to form an elongated security bar that extends across the steering wheel with the bar being long enough to extend beyond the rim of the steering wheel on at least one side of the bar. Each bar section has a forked attachment means which is suited for being telescopically received on the rim of the steering wheel when the bar sections have been connected and locked together for preventing the security bar from being lifted off the steering wheel. The improvement of the present invention relates to a configuration of the forked attachment means of the bar sections which comprises two fork tines connected to and extending beneath the bar section such that a double forked attachment means is provided with each fork being formed between the bar section and one of the fork tines. The two fork tines are transversely offset relative to one another to allow the respective forks of the double forked attachment means to be located on opposite sides of the reinforcing member of the steering wheel, thereby making it more difficult to remove the security bar by cutting through the rim of the steering wheel.

An additional embodiment according of the present invention utilizes a forked attachment means that cooperates with a central hub of the steering wheel. In this embodiment, the forked attachment means comprises an inner forked section connected to and extending both beneath and radially inwardly from a radial inner end of the bar section. The inner forked section is formed by two fork tines with the fork tines being spaced apart sufficiently far to allow the forked section to at least partially surround the steering wheel hub beneath the reinforcing crossmember.

BRIEF DESCRIPTION OF THE DRAWINGS

The present invention will be described hereafter in the Detailed Description, taken in conjunction with the following drawings, in which like reference numerals refer to like elements or parts throughout.

DETAILED DESCRIPTION

Figure 1:
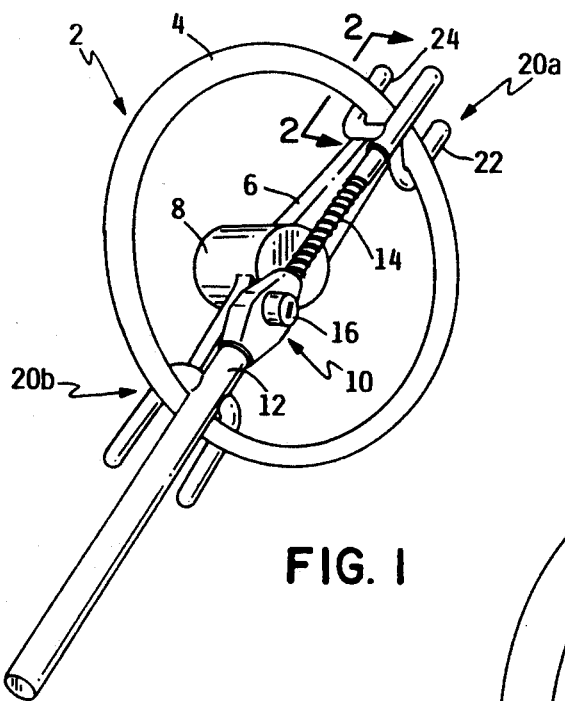
FIG. 1 is a perspective view of a first embodiment of an improved vehicle security device according to the present invention, illustrating such a device applied to a vehicle steering wheel.
Figure 2:
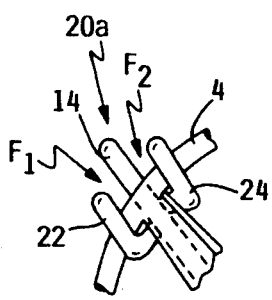
FIG. 2 is a perspective view of the vehicle security device shown in FIG. 1 looking upwardly at the underside of one end of the security device generally in the direction of the lines 2—2 in FIG. 1.

Referring first to FIGS. 1 and 2, a first embodiment of an improved vehicle security device according to the present invention is illustrated applied to a steering wheel 2 of a moveable vehicle (not shown). The vehicle may be of any type having a steering wheel or similar structure for guiding the vehicle, e.g. an automobile, truck, boat, etc. Steering wheel 2 may be of any generally conventional design and includes a peripheral rim 4, one or more reinforcing members 6 in the nature of spokes which extend radially inwardly from rim 4, and a central downwardly extending hub 8 that rotatably mounts steering wheel 2 to the vehicle steering apparatus. Hub 8 is typically mounted on the upper end of a steering column.

The vehicle security device shown in FIGS. 1 and 2 comprises an elongated security bar 10 having two separable bar sections 12 and 14 which may be releasably joined together by an appropriate locking means 16. For example, locking means 16 could comprise the key lock shown in FIGS. 1 and 2, but any other appropriate locking means could be used in its place, e.g. a combination lock or electronic lock device. The purpose of locking means 16 is to lock bar sections 12 and 14 together after they are assembled in place on steering wheel 2 and to allow the owner or user of the vehicle to unlock bar sections 12 and 14 to allow them to be separated and removed when it is desired to operate the vehicle. Locking means 16 prevents an unauthorized user from removing bar 10 from steering wheel 2 to discourage theft of the vehicle.

The details of security bar 10, including details of locking means 16 and how bar sections 12 and 14 are assembled together or interfit with one another, are generally well known in the prior art. A locking device of this type is disclosed in U.S. Pat. No. 4,738,127 to Johnson. This patent is hereby incorporated by reference to teach illustrative details of how bar 10 operates and is constructed. The present invention, which relates to an improved locking device of this general type, will be described herein only insofar as is necessary to understand the present invention.

In the prior art steering lock devices of this general type, each bar section is provided with a forked attachment means which is received on the steering wheel rim 4 when the bar sections 12 and 14 are assembled and locked together. These forked attachment means are needed to prevent the bar from simply being lifted off of steering wheel 2. In the prior art devices, each attachment means comprises a single forked configuration located on each bar section 12 and 14.

Referring still to FIGS. 1 and 2, the present invention comprises an improved forked attachment means 20 used on each bar section 12 and 14. One forked attachment means 20a is illustrated at the radially outer end of bar section 14. Another forked attachment means 20b is located on the other bar section 12. This attachment means 20b is not located at the radially outer end of bar section 12 as it is necessary for this bar section 12 to extend out past rim 4 of steering wheel 2 to allow bar 10 to perform its security function. Rather, attachment means 20b is located at an appropriate location on bar section 12 to allow both of the forked attachment means 20 to engage rim 4 of steering wheel 2 when bar sections 12 and 14 are assembled together and locked in place to form security bar 10. Attachment means 20a and 20b are generally identical and so only attachment means 20a will be described in detail.

Attachment means 20a includes two fork tines 22 and 24 which are integrally connected to and extend down beneath the overlying portion of bar section 14. Thus, each fork tine 22 and 24 forms a single fork with bar section 14. Since there are two tines 22 and 24 on attachment means 20a, the attachment means is double forked rather than having a single fork as in the prior art devices. A first fork $F_1$ is formed between tine 22 and bar section 14 and a second fork $F_2$ is formed between tine 24 and bar section 14.

Fork tines 22 and 24 are offset downwardly from bar section 14 to pass beneath rim 4 of steering wheel 2 when bar section 14 is on top of rim 4. In addition, the tines 22 and 24 are also offset transversely relative to bar section 14 and from one another. The amount of this transverse offset or spacing may have to be adjusted depending upon the construction of a particular steering wheel 2 and, more specifically, upon the shape and width of reinforcing member 6. But, it is intended that each fork $F_1$ and $F_2$ on the double forked attachment means 20a be received on opposite sides of the reinforcing member 6 at the point of connection between member 6 and rim 4 of steering wheel 2.

FIG. 2 illustrates the double forked attachment means 20a of security bar 10 applied to rim 4 of steering wheel 2 with forks $F_1$ and $F_2$ in place on opposite sides of reinforcing member 6. If a potential thief is trying to steal the vehicle and wishes to remove bar 10 by cutting through steering wheel 2 and not the bar itself, his work is made much more difficult by the double forked attachment means 20. He now has to cut on either side of each of the tines 22 and 24 before bar 10 can be lifted off steering wheel 2, requiring four separate cuts as compared to the two cuts that would typically have been required to cut on either side of a device with a single forked attachment means. Thus, twice the work is required to cut through the steering wheel and remove bar 10, further discouraging the thief from trying to defeat bar 10. Accordingly, security bar 10 as shown in FIGS. 1 and 2 is a substantial improvement over the prior art devices as it doubles the effort required to remove the device from steering wheel 2.

In order for bar 10 to operate as noted above, it is necessary that forks $F_1$ and $F_2$ be dimensioned to be located on either side of some type of reinforcing member 6 and for bar 10 to, in fact, be installed that way. If the double forks $F_1$ and $F_2$ are simply inserted onto rim 4 but not at the location of a reinforcing member 6, the device can still be removed using two cuts in the rim 4, i.e. one cut circumferentially outside of each fork 22 and 24. This would free up that end of bar 10 and allow the bar to be lifted off. Thus, it is necessary to proportion the device and to install it as shown in FIGS. 1 and 2 to get the added benefit of requiring four cuts to remove the device from rim 4. In addition, both bar sections 12 and 14 should have the double forked end 20 shown herein to have the enhanced security features. If one bar section still has a single forked end, the thief would simply cut through the rim 4 adjacent that single forked section, which would of course require only two cuts in rim 4.

Figure 3:
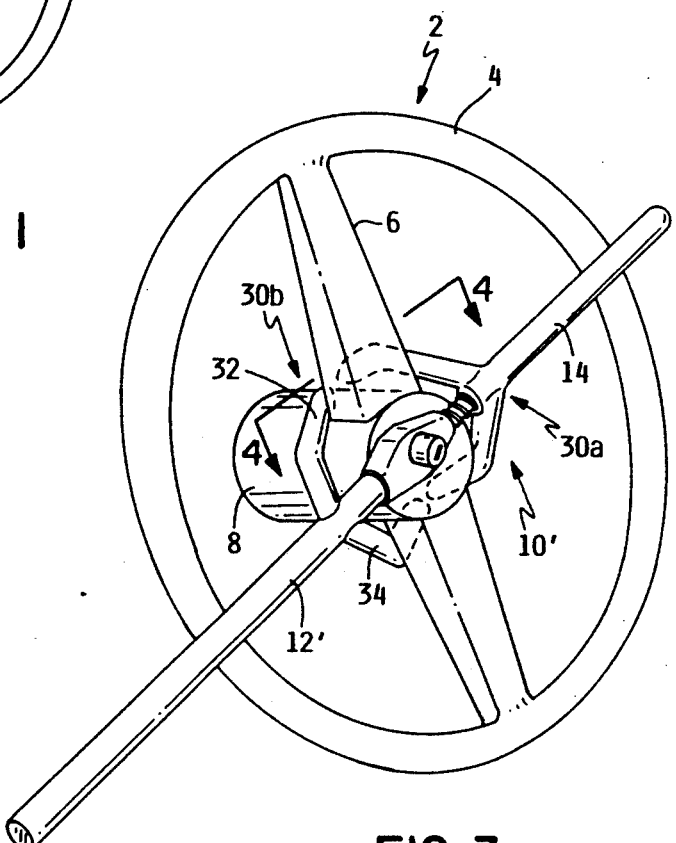
FIG. 3 is a perspective view of another embodiment of an improved vehicle security device according to the present invention, particularly illustrating that device applied to a vehicle steering wheel.
Figure 4:
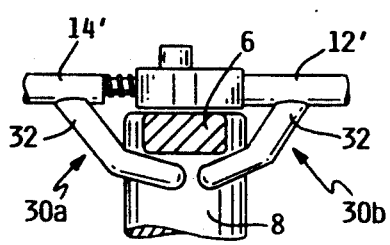
FIG. 4 is a partial cross-sectional view of the vehicle security device shown in FIG. 3 taken along lines 4—4 in FIG. 3, particularly illustrating the engagement of the device beneath the reinforcement member of the steering wheel and around the hub of the steering wheel.

A second embodiment of an improved locking bar according to the present invention is shown in FIGS. 3 and 4 as 10'. In this embodiment, the forked attachment means 20 that engage with rim 4 are not present at all. Bar sections 12' and 14' simply overlie rim 4 of the steering wheel 2 without being connected to or received on rim 4. However, in this embodiment of the invention, the attachment means on each bar section 12' and 14' now comprises an inner forked section 30a and 30b located at the radially inner end of each bar section.

As shown in FIGS. 3 and 4, each forked section 30 includes two downwardly extending tines 32 and 34 that are integrally connected to and formed with the bar section 12' or 14'. Tines 32 and 34 angle downwardly from the bar section and are transversely spaced apart a sufficient distance so as to be located on either side of the steering wheel hub 8 while the bar section overlies steering wheel 2. In this position, tines 32 and 34 form, in effect, a semicircular fork which is connected to bar 10 and at least partially surrounds hub 8 beneath reinforcing member 6 of steering wheel 2. The tines 32 and 34 on the attachment means 30 of the respective sections 12 and 14 are located closely adjacent one another in a face-to-face relationship after bar 10' is installed. See FIG. 4.

Security bar 10' as shown in FIGS. 3 and 4 is also more difficult to remove than the prior art steering lock type devices. Simply cutting rim 4 of steering wheel 2 will not allow bar 10' to be removed. Somehow one has to get the inner forked sections 30a and 30b of bar 10,, which sections extend downwardly from bar 10' around hub 8, out from beneath reinforcing member 6. One way to do this might be to cut through hub 8 beneath the level of the forked sections 30 to, in effect, cut steering wheel 2 off of the steering column. Or, one could try to cut through the reinforcing member 6 in a fashion to allow channels to be formed in reinforcing member 6 through which fork tines 32 and 34 could be lifted upwardly to lift bar 10' off. In this latter situation, the steering wheel rim 2 would probably be severed from hub 8. Thus, steering wheel 2 is basically destroyed and is no longer useful for steering the vehicle when using either method noted above for trying to remove bar 10'. Accordingly, security bar 10' cannot effectively be removed by cutting the steering wheel apart without destroying the steering wheel. Such destruction of the steering wheel will prevent the wheel from being turned and the vehicle driven off almost as surely as if bar 10' were still in place. Security bar 10' thus has a great deal of effectiveness.

The inner forked sections 30 are shown surrounding the hub 8 which is formed as part of the steering wheel 2. Such a hub usually sits on top of a steering column through which the steering shaft extends on its way to being connected to hub 8. If the steering wheel 2 has a very short hub 8, forked sections 30 could surround the steering column structure rather than the hub itself. Such an orientation is an equivalent to that shown herein and would be fully covered by the present invention.

Figure 5:
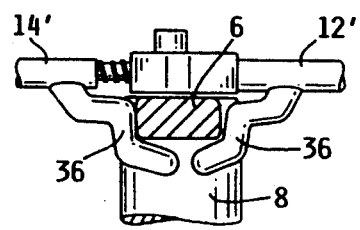
FIG. 5 is a partial cross-sectional view similar to that of FIG. 4 showing a further modification to the vehicle security device illustrated in FIG. 3.

A further modification of the security bar 10' shown in FIG. 3 is illustrated in FIG. 5. In this version, the fork tines 32 and 34 which extend downwardly from bar sections 12' and 14' to form the forked sections that surround hub 8 are stepped or notched as shown at 36 to abut against the sides of reinforcing member 6 and prevent any relative rotation between bar 10' and steering wheel 2. With the device shown in FIGS. 3 and 4, a thief could potentially grab bar 10' and rotate it around hub 8 of steering wheel 2 until such time as one of the fork tines 32 or 34 hits against reinforcing member 6. The stepped arrangement of the tines shown in FIG. 5 would allow essentially no relative rotation between bar 10' and steering wheel 2.

Both of the security bars 10 and 10' of this invention are designed to better protect the vehicle than prior art devices of this type by dramatically increasing the effort required to remove or defeat the bar by cutting through portions of steering wheel 2. In the known prior art devices, a thief can remove them by making two simple cuts in rim 4 of steering wheel 2. For the bar 10 of the present invention, as shown in FIGS. 1 and 2, at least four cuts are required in rim 4, doubling the effort required to defeat the bar. In the bar 10' of FIGS. 2 through 5, steering wheel 2 now basically has to be cut off the steering column to remove the bar. Obviously, this latter situation yields a vehicle which is undriveable anyway when steering wheel 2 is removed.

Various modifications of this invention will be apparent to those skilled in the art. For example, in the embodiment of FIGS. 3 and 4, the tines 32 and 34 on the attachment means 30a and 30b could be made longer and transversely offset from one another so as to overlap or pass one another beneath reinforcing member 6. Or, tines 32 and 34 in the respective means 30a and 30b could be made to telescopically fit together when bar sections 12' and 14' are connected together. Thus, the scope of the present invention is to be limited only by the appended claims.

I claim:

1. An improved vehicle security device suited to be attached to the steering wheel of a vehicle, the steering wheel having a peripheral rim, at least one reinforcing crossmember which extends inwardly from the rim in a generally radial direction, and a central hub beneath the crossmember for rotatably mounting the steering wheel on the vehicle, wherein the security device is of the type having two separable bar sections which may be connected and locked together to form an elongated security bar that extends across the steering wheel with the bar being long enough to extend beyond the rim of the steering wheel on at least one side of the bar, each bar section having a forked attachment means for preventing the security bar from being lifted off the steering wheel when the bar sections have been connected and locked together, wherein the improvement relates to a configuration of the forked attachment means of each bar section which comprises:

an inner forked section connected to and extending beneath a radial inner end of the bar section, wherein the inner forked section is formed by at least one fork tine which extends radially inwardly from its point of connection to the bar section to point towards the steering wheel hub with the fork tine being long enough to allow the fork tine to pass around at least a portion of the steering wheel hub and to be located beneath the reinforcing crossmember.

2. An improved vehicle security device suited to be attached to the steering wheel of a vehicle, the steering wheel having a peripheral rim, at least one reinforcing crossmember which extends inwardly from the rim in a generally radial direction, and a central hub beneath the crossmember for rotatably mounting the steering wheel on the vehicle, wherein the security device is of the type having two separable bar sections which may be connected and locked together to form an elongated security bar that extends across the steering wheel with the bar being long enough to extend beyond the rim of the steering wheel on at least one side of the bar, each bar section having a forked attachment means for preventing the security bar from being lifted off the steering wheel when the bar sections have been connected and locked together, wherein the improvement relates to a configuration of the forked attachment means of each bar section which comprises:

an inner forked section connected to an extending beneath a radial inner end of the bar section, wherein the inner forked section is formed by two fork tines which extend radially inwardly from their point of connection to the bar section relative to the steering wheel hub such that the fork tines point towards the steering wheel hub with the fork tines being spaced apart sufficiently far to allow the forked section to at least partially surround the steering wheel hub beneath the reinforcing crossmember.

3. A vehicle security device as recited in claim 2, wherein the fork tines of each forked section form a fork which surrounds approximately one half of the steering wheel hub.

4. A vehicle security device as recited in claim 3, wherein the forked sections on the respective bar sections have the fork tines thereof located closely adjacent one another when the forked sections are in place around the steering wheel hub.

5. A vehicle security device as recited in claim 2, wherein the fork tines are notched or stepped to abut against a side face of the reinforcing crossmember to prevent relative rotation between the security bar and the steering wheel.

6. A vehicle security device as recited in claim 2, wherein the fork tines and bar sections are made of hardened steel.

* * * * *